O. H. WISENANT.
WHEEL TRACTION ATTACHMENT.
APPLICATION FILED MAR. 18, 1910.

980,728.

Patented Jan. 3, 1911.

Witnesses
Harry King
U. B. Hillyard

Inventor
Oscar H. Wisenant.
By Victor J. Evans
Attorney

UNITED STATES PATENT OFFICE.

OSCAR H. WISENANT, OF CHICAGO, ILLINOIS.

WHEEL TRACTION ATTACHMENT.

980,728.　　　　　　　　Specification of Letters Patent.　　　Patented Jan. 3, 1911.

Application filed March 18, 1910. Serial No. 550,144.

*To all whom it may concern:*

Be it known that I, OSCAR H. WISENANT, a citizen of the United States, residing at Chicago, in the county of Cook and State of Illinois, have invented new and useful Improvements in Wheel Traction Attachments, of which the following is a specification.

The invention relates to anti-slipping devices for use in connection with vehicle wheels provided with pneumatic cushion or other yieldable tires, the purpose being to provide connecting means which will admit of repairs being cheaply and quickly made in the event of it becoming necessary to replace worn parts.

The invention relates to the class of devices embodying chains arranged upon opposite sides of the tire and transverse chains extending across the tread of the tire and connected at their ends to the side chains, the purpose being to provide novel connecting means between the transverse and side chains, whereby worn chains may be quickly removed and new chains placed in position with ease and despatch.

The invention consists of the novel features, details of construction and combination of parts, which hereinafter will be more particularly set forth, illustrated in the accompanying drawing, and pointed out in the appended claim.

Figure 1:
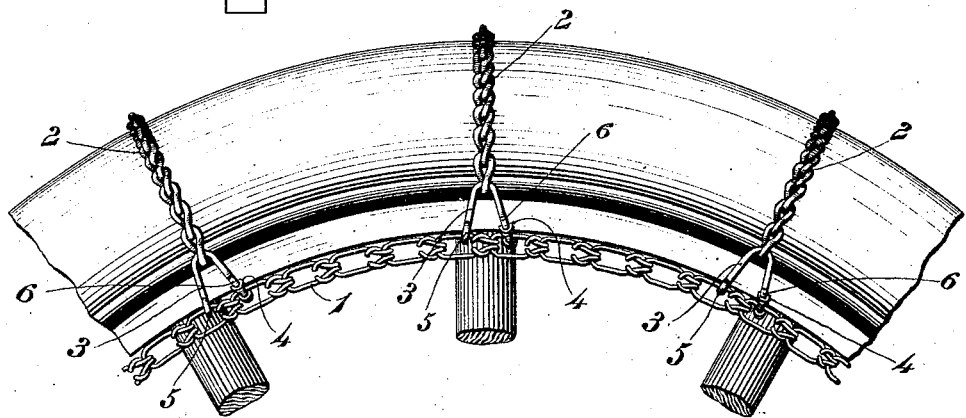
Figure 2:
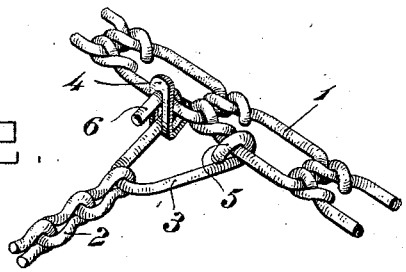
Figure 3:
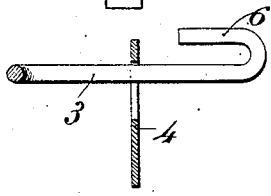
Figure 4:
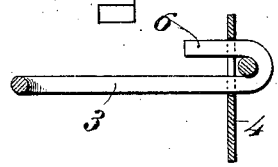
Figure 5:
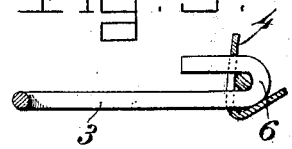
Figure 6:
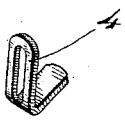

Referring to the drawing, forming a part of the application, Figure 1 is a side view of a portion of a tire provided with an antislipping appliance embodying the invention. Fig. 2 is a perspective view, showing more clearly the link connection between a transverse and a side chain. Fig. 3 is a longitudinal section of the link, showing the lock suspended thereon. Fig. 4 is a view of the parts illustrated in Fig. 3, showing the hooked end of the link member engaged with the side chain and the lock moved so as to engage both the bill of the hook and the member of the link. Fig. 5 is a view of the parts shown in Fig. 4 having the lock bent about the member of the chain engaged by the hook member of the link. Fig. 6 is a detail perspective view of the lock folded upon itself.

Corresponding and like parts are referred to in the following description, and indicated in all the views of the drawing, by the same reference characters.

The traction or anti-slipping attachment is of such construction as to be removably fitted to the tires of pneumatic cushion and like soft tread wheels and embodying side chains and transverse chains, the latter extending across the tread of the tire and connected at their ends to the side chains.

In the drawing the numeral 1 designates a side chain and 2 transverse chains, which are connected to the side chain by means of links 3. The present invention relates more particularly to the connecting link 3 and the lock 4 coöperating therewith. It is to be understood that the transverse chains are connected at their ends to the side chains by means of links 3, so that the transverse chains may be readily replaced when desired from any cause. The link 3 is approximately of V-form, one member terminating in a closed eye 5 and the other member terminating in a hook 6, which is adapted to be coupled to or uncoupled from a link of the side chain so as to admit of the transverse chain being quickly placed in position or removed. The link 3 is permanently connected by the eye 5 to one of the links of the side chain and the hook 6 is provided to admit of the other member of the link making detachable connection with the side chain, so that when required the transverse chain 2 may be slipped upon the link 3 or removed therefrom. When the member of the link 3 having the hook 6 is disconnected from the side chain the transverse chain may be either slipped upon the link or removed therefrom. When the transverse chain is in position and the hook 6 engaged with the side chain the connection is made secure by means of the lock 4, which consists of an oblong link of flexible material, such as annealed steel or other softened or pliable metal. The link 4 is closed and preferably struck from sheet metal and is bendable so as to be doubled upon itself and again straightened without fracture. The link 4 is slipped upon the connecting link 3 after the transverse chain has been attached thereto and prior to engaging the hook 6 with a link of the side chain 1. After the transverse chain 2 has been placed in position upon the link 3 and the lock 4 slipped upon the said link 3 the hook 6 is engaged with a link of the side chain, after which the link 4 is moved so as to engage the hook 6 when the said link 4 is bent about the link of the side chain engaged by the hook 6 and pressed toward the link 3 so as to engage over the butt or closed end of the hook 6, as indicated most clearly in Fig. 2. When it is required to disengage the link 3 from the side chain to admit of removal of the transverse chain the end of the lock 4 engaged with the butt of the hook 6 is released from the latter and bent to admit of the lock clearing the hook 6, after which said hook may be disengaged from the side chain and subsequently admit of both the lock and transverse chain 2 being removed from the connecting link 3.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

A traction attachment for vehicle wheels comprising transverse and side chains, links of substantially V-form connecting the transverse chains with the side chains, said V-links having one member permanently connected to the side chains by means of a closed eye and having the other member detachably connected with the side chains by means of hooks, and locks for securing the hook members of the V-links to the side chains, said locks consisting of oblong links having one end engaging the hooks, thence bent about the members of the side chains engaged by the hooks and engaged with the butts or closed ends of the hooks, substantially in the manner specified.

In testimony whereof I affix my signature in presence of two witnesses.

OSCAR H. WISENANT.

Witnesses:
P. M. BRADY,
EDW. J. MITCHELL.